Figure 1:
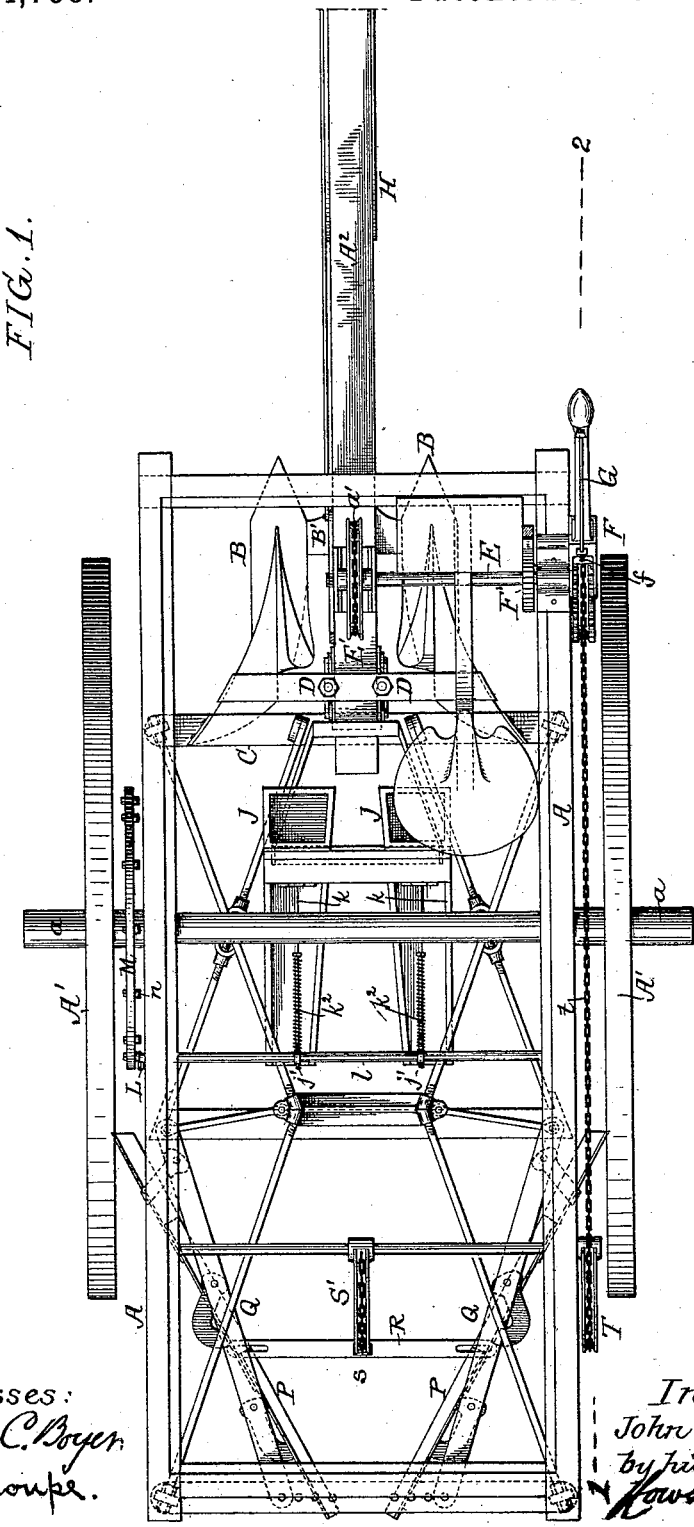

(No Model.)  2 Sheets—Sheet 1.

J. O'BOURKE.
CANE PLANTING MACHINE.

No. 454,758.  Patented June 23, 1891.

Witnesses:
Murray C. Boyer
A. V. Groupe

Inventor
John O'Bourke
by his Attorneys
Howson & Howson

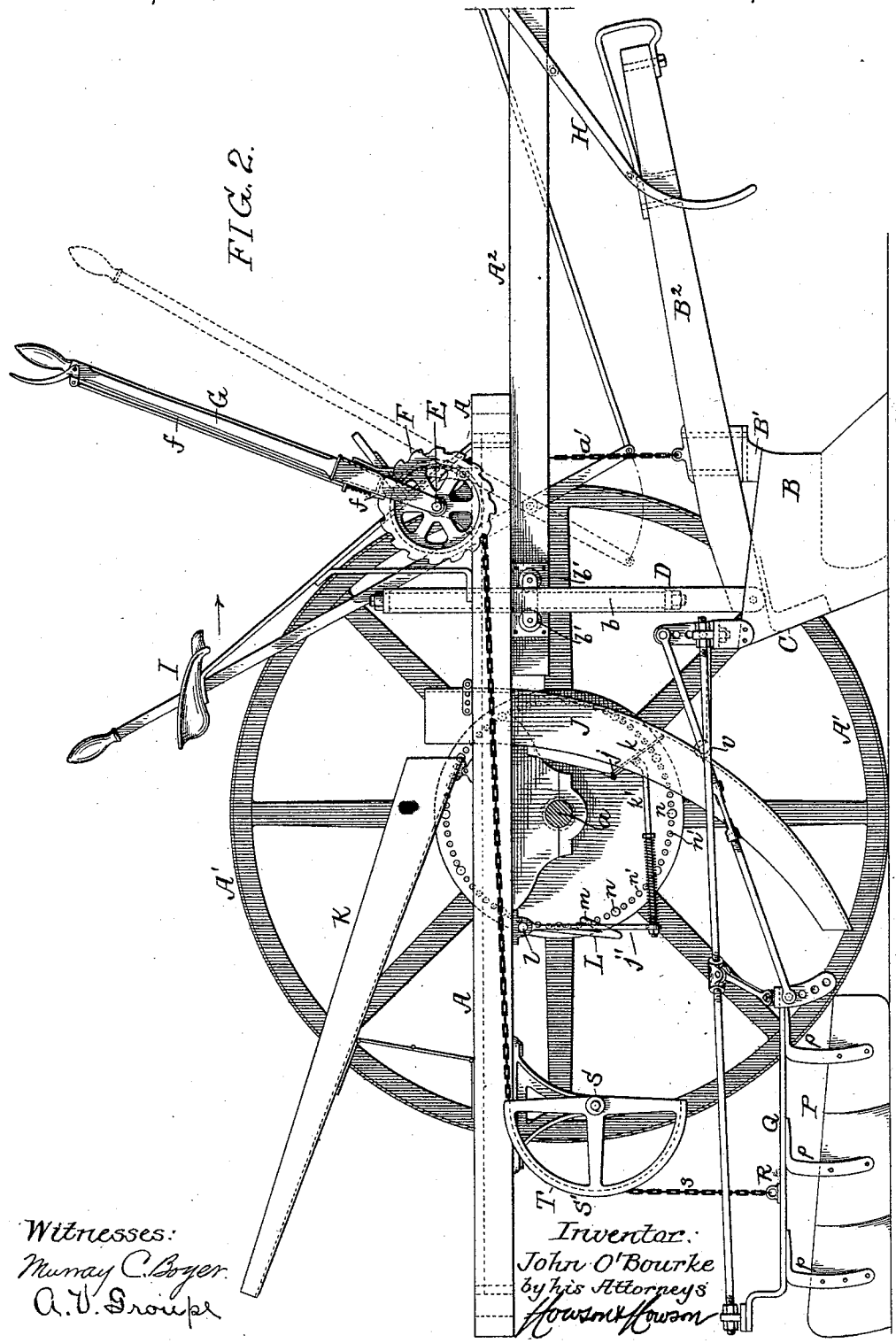

UNITED STATES PATENT OFFICE.

JOHN O'BOURKE, OF CIENFUEGOS, CUBA.

CANE-PLANTING MACHINE.

SPECIFICATION forming part of Letters Patent No. 454,758, dated June 23, 1891.

Application filed November 15, 1890. Serial No. 371,538. (No model.)

*To all whom it may concern:*

Be it known that I, JOHN O'BOURKE, a citizen of the United States, and a resident of Cienfuegos, Cuba, have invented certain Improvements in Cane-Planting Machines, of which the following is a specification.

The object of my invention is to construct a simple and effective machine for planting sections of sugar-cane or sorghum in sugar-producing countries, the machine being so constructed as to open the ground, deposit the sections of cane at regular predetermined intervals in the furrows, and finally to cover the cane with earth.

In the accompanying drawings, Figure 1 is a plan view of a machine constructed in accordance with my invention, the platform on the frame of the machine being removed in order to more clearly show the operating parts; and Fig. 2 is a vertical section on the line 1 2, Fig. 1.

The main frame-work A is carried by an axle $a$, on the opposite ends of which are mounted two wheels A'. This frame serves to support the operating parts and from its front end extends a guiding-tongue $A^2$. Immediately under the front of the frame A are a pair of plows or furrowing-blades B, which are firmly secured to each other by a yoke B', from the center of which extends the plow-beam $B^2$, to which the oxen or horses are hitched. The rear ends of the plows are secured together by a transverse brace-bar C and are kept in proper position by vertical guide-bars D, which pass up over the tongue $A^2$, and to which are secured guiding-rods $b$ passing between rollers $b'$ on either side of the tongue. These plows are of the peculiar form shown and have their opposite faces of similar mold-board shape, so that they will make simple furrows in the ground, the space between the plows being sufficient to permit the accumulation of the earth turned up by the adjacent faces of the plows.

On the front portion of the frame A is mounted an axle or shaft E, at the center of which is secured a wheel or quadrant E', and to which is secured a hoisting-chain $a'$, extending down to the plow-beam $B^2$. That end of the shaft nearest the driver's seat is provided with ratchet-wheels F F', and with the ratchet-wheel F engages a pawl $f$, pivoted to a lever G and adapted to be operated by a pawl-bar $f'$. By using this lever the driver can readily lower the plows to any desired distance in the ground or may remove them entirely from contact with the ground in traveling to and from the field of operation.

In order to depress the point of the plow to suit different soils, I provide a lever H, pivoted to the tongue $A^2$, and having its lower end embracing the plow-beam $B^2$, and adapted to bear on the upper face of said plow-beam, so that by the operation of a lever I the operator may move the lever H in the direction of the arrow and depress the plow-beam and the point of the plow to a greater or less extent, as desired, the position which the operating-lever I assumes when the plows are fully depressed being shown by dotted lines in Fig. 2.

At some distance in the rear of the plows are curved cane-chutes J, hinged at $j$ to the frame A, and each having communication with an inclined chute K above the platform A and forming feeders for the cane-chute, the sections of cane being lifted from a suitable receptacle on the platform A by the attendants and dropped one by one into the inclined chutes K, from which they descend into the curved chutes J. Midway of their length these chutes are provided with gates or shutters $k$, hinged at their outer upper ends to the chute, and each connected by a rod $k'$ to an arm $j'$, secured to a rock-shaft $l$, held in bearings on the main frame A. At one end of this rock-shaft is secured an arm L, having an upwardly-inclined portion $m$, with which engage a series of pins $n$ on a disk M. This disk is secured to the hub of one of the supporting-wheels, so that it will revolve as the machine is moved, and is provided with a number of equidistant orifices $n'$, in which the pins $n$ may be placed. These pins may be readily removed and placed at any distance from each other, so that the sections of cane may be dropped at any desired distance from each other, the pins as they rotate pressing the arm L back and partially rotating the rock-shaft $l$, so that the shutters $k$ are opened as each pin comes in contact with the arm and a piece of cane is permitted to fall from each chute into the furrows.

On the rods $k'$ are placed springs $k^2$, so that any forward movement of the arm L will merely compress the spring, this construction being desirable when the machine has to be backed, in which case the pins $n$ will cause a movement of the arm L in the wrong direction.

Immediately in the rear of the cane-chutes J are a pair of covering-blades P, supported at the rear end of an adjustable framing Q, of which the transverse bar C, extending across and secured to the rear end of the plows, forms the front portion. This frame-work is formed of a number of transversely-placed bracing-bars and is adjustable, as shown more clearly in Fig. 2, the covering-blades P being secured to said frame by braces $p$, which may also be adjusted to various positions on their bars.

Immediately above the covering-blades P is a rock-shaft S, held in bearings on the main frame-work and provided with two quadrants S' and T, the quadrant S' having secured to it a chain $s$, extending down to the rear portion of the covering-blade frame, while the quadrant T is provided with a chain $t$, extending to a small winding-drum formed in the center of the double ratchet-wheel F at the front portion of the machine. By using the lever G, therefore, the operator by a single movement can raise the plows and the covering-blades to any height from the ground, and by means of a roller $v$, secured to the frame-work Q and pressing against the cane-chutes J, this upward movement of the frame and plows will cause a tilting or swinging of the cane-chutes on their hinges $j$ and will elevate their discharging ends some distance above the ground.

Having thus described my invention, I claim and desire to secure by Letters Patent—

1. The combination, in a cane-planting machine, of the twin plows or furrowing devices at the front end of the machine and adapted to form two parallel furrows, the cane-chutes in the rear of said plows, and a single pair of covering-blades by which the two rows of cane planted are covered in one hill, substantially as specified.

2. The combination, in a cane-planting machine, of the main frame A, the lower frame Q, covering-blades carried thereby, and a plow or plows attached to the front end of said frame, with devices for raising and lowering said plow and frame, comprising the quadrants S', T, and E', chains connecting said quadrants to a power-shaft, and mechanism for turning said shaft, substantially as specified.

3. The combination, in a cane-planting machine, of the main frame A, the lower frame Q, covering-blades carried thereby, a plow-beam attached to the front of said frame, a cane-chute hinged to the frame A, and a roller carried by said frame Q and adapted to act on said cane-chute on the raising or lowering of said frame, substantially as specified.

4. The combination, in a cane-planting machine, of the frame A, the tongue $A^2$, extending therefrom, the plows B, hung to said frame, the plow-beam $B^2$, a lever H, hinged to said tongue and adapted to bear upon the plow-beam, and a hand-lever I, fulcrumed to the frame-work and connected to the lever H, substantially as and for the purpose set forth.

5. The combination, in a cane-planting machine, of a delivery-chute, a hinged shutter or door thereon, and devices for opening said shutter, comprising a rotated disk, a series of pins thereon, a rock-shaft $l$, an arm L on said rock-shaft, adapted to engage with said pins, an arm $j'$ on the rock-shaft $l$, and a rod $k'$, connecting the arm $j'$ with the shutter, substantially as specified.

6. A device for regulating the discharge of cane from the feed-chute of a planting-machine, consisting of a disk having a series of equidistant or nearly equidistant orifices and pins adapted to such orifices, substantially as specified.

In testimony whereof I have signed my name to this specification in the presence of two subscribing witnesses.

JOHN O'BOURKE.

Witnesses:
JULIO EHNINGER,
LUIS EHNINGER.